United States Patent [19]
Pearson

[11] 3,793,113
[45] Feb. 19, 1974

[54] ADHESIVE COMPOSITIONS AND METHOD OF MAKING PLYWOOD
[76] Inventor: Clifford H. Pearson, Star Rt., Box 607-H, Winston, Oreg. 97496
[22] Filed: July 13, 1972
[21] Appl. No.: 271,258

[52] U.S. Cl............... 156/335, 161/262, 260/17.2, 260/17.4 ST
[51] Int. Cl............................ C09j 3/14, C09j 5/06
[58] Field of Search..... 260/17.2; 161/262; 156/335

[56] References Cited
UNITED STATES PATENTS
3,591,535  7/1971  Jarvi ................................. 260/14
3,268,460  8/1966  Miller et al. ...................... 260/17.2

Primary Examiner—William H. Short
Assistant Examiner—Edward Woodberry
Attorney, Agent, or Firm—M. H. Hartwell, Jr.

[57] ABSTRACT

An adhesive for the bonding of wood such as veneers in the production of products such as plywood. The adhesive contains a phenolic resin, and from 4 to 11 percent by weight polyvinyl alcohol based on the resin solids in the adhesive. The resin in the adhesive includes fractions at two degrees of advancement, including a fraction of relatively low molecular weight and a fraction of relatively higher molecular weight. The polyvinyl alcohol is introduced into the adhesive as part of a glutinous mass including cereal flour and water, whereby the material may become fully dispersed in the adhesive during its manufacture. The adhesive when used to make plywood and with relatively low spreads exhibits excellent prepressability. The adhesive produces good bonds between woods of different densities and moisture contents, and between woods of different species as, for instance, hardwood and softwood, by reason of a controlled penetrating characteristic of the adhesive. The adhesive is particularly well adapted for the bonding of thin hardwood veneers, with minimal to no staining resulting through its use.

4 Claims, No Drawings

ADHESIVE COMPOSITIONS AND METHOD OF MAKING PLYWOOD

This invention relates to the manufacture of adhesives or glues from phenolic resins. The invention particularly concerns adhesives of this description of the type utilized in the bonding of wood, such as the wood veneers making up a plywood product.

Among the various features that may be said to characterize the adhesives of the invention, is the excellent tolerance they exhibit to variations in moisture contents, densities, and wood species. This permits the adhesives to be used in the manufacture of plywood, for instance, with far less criticality required in the drying of the woods, and the selections of the woods used in the manufacture. The adhesives also are particularly well suited for the manufacture of a plywood product from hardwood veneers, bonded either to a hardwood base or to a base of softwood, such as the coniferous woods, exhibiting in such a manufacture minimal to no tendencies to produce staining of the hardwood veneer. Another very important beneficial characteristic of the adhesive is what might be referred to as their tackiness or body, which imparts to the adhesives excellent prepressability, which is the ability of the adhesive when applied between two veneer pieces to contain the two pieces in the assembly properly oriented, and without the slipping of one on the other prior to the assembly being introduced into a hot press. Furthermore, this prepressability is obtained with relatively light spreads of the adhesives.

Generally, one object of the invention is to provide improved adhesives for bonding materials such as woods, having superior controlled penetration properties.

Another object is to provide adhesives, suitable for the manufacture of such products as plywood, exhibiting excellent prepressability characteristics.

Another object is to provide improved adhesives, and a method of manufacturing them, exhibiting good tolerance for variations in moistures and densities in the woods they bond.

A further object is to provide adhesives particularly adapted for the bonding for hardwood veneers, that exhibit minimal staining characteristics.

A somewhat related object is to provide adhesives which may be prepared with relatively low alkalinity thereby to inhibit overpenetration in hardwoods and resulting staining.

Among other objects is the provision of novel adhesives featuring relatively high polyvinyl alcohol contents imparting prepressability and nonstaining properties.

A further object is to provide an improved method of manufacturing an adhesive containing polyvinyl alcohol, where such is readily incorporated in a completely dispersed state within the adhesive composition.

Yet a further object of the invention is to provide adhesives that may be readily used in the production of plywood meeting exterior grade standards.

Yet another object is to provide a so-called wet adhesive usable in the production of plywood products from hardwood veneers.

A still further object is to provide improved adhesives, suitable for use in the manufacture of plywood products which produce good bonds but which nevertheless make possible substantial cost reductions. This is partly by reason of sharply reduced glue costs experienced through their use, in comparison with other adhesives of comparable performance. Also important, of course, is such factors as the prepressability mentioned above, and the greater tolerance of the adhesives for differences in moisture, density variations, etc., which have the effect of reducing the complexities of plywood manufacture, minimizing the rejection rate of plywood products produced, etc.

These and various other objects and advantages of the invention will become more fully apparent from a reading of the following description, which includes certain examples set forth to illustrate specific forms of the adhesives herein contemplated.

Speaking in general terms, the adhesive compositions of the invention are prepared by preparing a mixture containing a phenolic resin, i.e., a phenol aldehyde resin, with such mixture containing a fraction of relatively low molecular weight resin, i.e., resin at a low stage of advancement, and a fraction of resin at a more highly advanced stage and having, therefore, a higher molecular weight. The mixture further includes, in addition if desired to the usual extenders, a significant amount of polyvinyl alcohol, ranging in amounts from about 4 to 11 percent by weight of the resin solids in the adhesive composition. The polyvinyl alcohol may be incorporated into the adhesive by first preparing a blend of cereal flour, water and polyvinyl alcohol, to produce a glutinous mass therefrom having the polyvinyl alcohol well dispersed throughout the mass. Such may then be introduced into an aqueous solution of phenol aldehyde resin, without the formation from the polyvinyl alcohol of gelatinous nodules resulting apparently from the material coalesce to form rubbery balls or masses before having a chance to become completely dissolved and dispersed. The adhesive compositions further may be prepared, according to preferred embodiments of the invention, with phenolic resins having relatively high mole ratios of formaldehyde to phenol, within the range of about 2.0:1 to 2.6:1. Furthermore, and again as contemplated by preferred embodiments of the invention, the final adhesive compositions may be prepared with relatively low alkilinity, i.e., with pHs ranging from about 9 to 10.5, as compared to conventional phenolic adhesives employed which typically may have pHs ranging from about 11 to 13.

The adhesive compositions have as one very important characteristic a tacky quality, imparting what is referred to as prepressability, important when used in manufacturing plywood from veneers. Prepressability is a property which inhibits veneers, on their being stacked on top of one another and with a spread of adhesive between them, from tending to slip relative to each other, thus to become disoriented, so that when the veneers are placed in a hot press they are not properly aligned. Prepressability has been attained in prior-known adhesives, but usually at the expense of using high weights of glue spread, ranging, for instance, from about 60 to 85 pounds of adhesive per 1,000 square feet of double glue line. According to this invention, adhesive may be prepared exhibiting the desired prepressability, obtained with spreads ranging from about 35 to 45 pounds per 1,000 square feet of double glue line. In addition to prepressability, the adhesives possess a bondability comparable to the heavier spreads of prior-known adhesives just mentioned. The reduced spreads indicated obviously are important for a number of reasons, including making possible substantial savings by reason of reduced glue costs.

Another characteristic of the adhesives of the invention is the tolerance they afford in the use of wet and dry veneers, and woods of variable densities, including woods of different species. The polyvinyl alcohol apparently imparts to the adhesives controlled penetrating properties, whereby they have requisite penetration with relatively dry woods, without overly penetrating the wetter woods. Furthermore, adequate penetration is exhibited between woods of different densities which may, for instance, be between two softwood types as with the coniferous woods, where one veneer might be primarily summer growth and one derived from harder winter growth. More importantly, this controlled penetration is significant in bonding woods of two different species, such as the coniferous woods to the so-called hardwoods, as exemplified by oak, birch, lauan, etc., which typically have densities ranging upwardly from 0.6 as compared to the softwoods which usually have densities below about 0.5.

The prepressability and control of penetration afforded by the adhesive compositions, and their relatively low alkalinity, render the adhesives particularly well suited for the manufacture of plywood products having a hardwood veneer bonded on their faces. In such a manufacture, it should be remembered that not infrequently the hardwoods are cut in relatively thin veneers, as it has been found that such inhibits checking, etc. in the veneer when such is used as an exterior facing. To inhibit splitting, etc. during the handling of these veneers, it is common to prepare such veneers with moisture contents ranging from about 8 to 15 percent (moistures herein refer to the weight of water contained, expressed as a percent of the dry weight of wood). Douglas fir or other conifer typically might be processed with a lower moisture content ranging from about 3 to 5 percent. The reduced alkalinity of the adhesives and their controlled penetrability inhibits bleeding through thin hardwood veneer faces with resulting staining and discoloration. The prepressability inhibits any tendency for the hardwood veneer to curl, thus to effect the nature of the adhesive bond ultimately produced.

It is recognized that urea-melamine resins have been employed in manufacturing exterior plywood products incorporating hardwood veneer faces. Urea-melamine resins are acidic in nature, and, therefore, do not exhibit the tendency to stain wood that is typical of the usual phenolic resins. The urea-melamine resins, however, are relatively expensive, and considerably more costly to use in making glue lines, and are not as durable and are difficult to handle.

Many hardwood phenolic glues which are used in a liquid state (as opposed to film type glues) employ solvents of various types other than water, in order that resin advancement can be carried further thus to inhibit overpenetration of the hardwood with resulting staining. Such adhesives are expensive, have poor storage life, and the moisture of the wood with which the adhesives are used is critical, because the flow factor of the resin is dependent on this wood moisture. With the adhesives of the invention which are spread with relatively low spreads, and which employ water as the vehicle, more dependable bonds are produced, and this is obtained together with the unique feature of reduced or no staining. It might be pointed out here that because of the low spreads that are utilized, relatively little water is incorporated into the plywood lay-up assembly which is important in inhibiting blowing and blisters, as oridinarily might result when curing glue lines bonding high moisture content hardwood veneers.

The adhesives of the invention can be utilized with the usual types of extenders, including the metallic types such as diatomaceous earth (perlite), silica, etc. Walnut shell flour has been utilized, which has the additional advantage of incorporating into the adhesive an antislip property. A material which is incorporated with most of the compositions of the invention is a cereal flour, such as wheat flour, such having a glutinous quality when mixed with water. The flour is of principal importance in the compositions of the invention, in connection with the manner in which the polyvinyl alcohol (in the relatively large quantities herein contemplated) is incorporated into the compositions, in a wholly dispersed form, and without the production of rubbery nodules or granules which, if present in the final adhesive, would render it unsuitable for use. In this connection, the dispersion of the polyvinyl alcohol in flour is done with the pH conditions of the usual flour and water mixture, which is within the range of 6 to 8. This lack of alkalinity enhances polyvinyl alcohol dispersion.

The characteristic of the adhesives whereby they exhibit a tolerance for wide moisture variations, in addition to producing beneficial results for the reasons above noted, has the further advantage of reducing the demands placed upon a dryer or dryers by a plywood manufacturer. Further explaining, with wetter veneers permissible in the production of plywood, it is obvious that to obtain a given production of dried veneer, a reduced dryer capacity is required to obtain such production. As a corollary, for any given dryer, the production of the dryer is increased. The reduced need for drying also is important from an environmental standpoint. Drying to a relatively wet level has been noted substantially to reduce the volatile materials ejected into the atmosphere by the dryer, which can be the cause of pollution problems.

The adhesive compositions of the invention, where such are intended for the bonding of hardwood veneer, have a relatively high proportion of resin solids, which typically might range from about 26 to 36 percent by weight of the total adhesive composition. Higher proportions may be employed, but ordinarily such would not be done for economic reasons, since resin costs represent a substantial part of the cost of the total adhesive. With adhesive conpositions designed for use with the softwoods or coniferous woods, lower weight ratios of resin solids are permissible, such oridinarily in these instances ranging from about 18 to 24 percent by weight of the total adhesive composition. Again the upper weight limit indicated is dictated primarily by economic reasons.

The total water content of the adhesive composition typically may fall within the range of about 45 to 65 percent by weight with the preferred range being from 50 to 60 percent. The remainder of the adhesive composition comprises extender material, such as vegetable shell flour or diatomaceous earth, cereal flour (employed in producing a dispersion of the polyvinyl alcohol), the polyvinyl alcohol, and such other materials as antifoaming agents in minor amounts (such as pine oil or silicone), and an alkaline material (the use of such material usually is limited to adhesives to be employed with the coniferous or softwoods, and includes the hydroxides, carbonates and/or bicarbonates of the alkali metals, particularly sodium and potassium). The presence of the alkaline material is to promote digestion of the comminuted vegetable shell material, i.e., shell flour, bark flour, etc., incorporated with the adhesive composition, and to catalyze curing of the adhesive. When incorporated with an adhesive composition, the alkaline material ordinarily would be included in an amount up to about 25 percent by weight of the comminuted shell material present in the composition.

Polyvinyl alcohol is obtainable commercially as a dry powdery substance, and although such is sometimes indicated in commercial brochures as having limited solubility in water, obtaining a good dispersion of polyvinyl alcohol in water utilizing the relatively large amounts employed according to the instant invention, has been found to be relatively difficult. The polyvinyl alcohol, on being introduced into water, tends to coalesce with itself to form rubbery masses or nodules, which will not then dissolve and which are unsuitable in the adhesive when applied. As contemplated by the instant invention, a paste is prepared from cereal flour and water, which may also include the comminuted vegetable shell material if such is to be incorporated into the adhesive composition. Such is blended to produce a glutinous, flowable mass, and the polyvinyl alcohol is then introduced, as by sprinkling it into the mass with subsequent mixing, whereby the polyvinyl alcohol becomes dispersed and dissolved therein. Using this approach, good dispersion of the polyvinyl alcohol is attained, and the resulting mixture is readily incorporated with other ingredients of the adhesive composition. Ordinarily the amount of cereal flour used to prepare such paste is in an amount about equal to or exceeding the amount of polyvinyl alcohol introduced into the adhesive, and the amount of water used to produce the glutinous mass from such flour is enough to make a flowable consistency of the paste which is prepared.

The phenolic resin which is prepared to be employed in the invention is one having a relatively high mole ratio of formaldehyde to phenol, in comparison to conventionally now utilized resins. For instance, it is contemplated in preferred embodiments of the invention that the mole ratio indicated be within the range of about 2.0:1 to 2.6:1, with the mole ratio most generally being within the range of about 2.1: to 2.4:1. By using a phenolic resin of this description, better control of penetration results and improved bonds are obtained. Further, the curing rate of the adhesive compositions tends to be accelerated, over the curing rates to be expected with lower mole ratios. The phenolic resin also typically has a resin solids content ranging from 45 to 60% by weight.

In preparing the adhesive compositions of the invention, phenolic resins having two degrees of advancement are mixed to obtain the final adhesive product. Thus, the final adhesive composition includes a resin fraction of relatively low molecular weight, and another fraction of somewhat higher molecular weight. Both fractions are what is known as stage 1 resins, since both fractions are fusible and soluble in water. Since resins having the mole ratios indicated of formaldehyde to phenol tend to exhibit less stability when made low in alkalinity than the more conventional resins, it is convenient to prepare the compositions of this invention utilizing resins of relatively low molecular weight, with one fraction of such resin being reacted for a period of time (usually from about 10 to 45 minutes) at temperatures ranging from about 150° F. to reflux temperature, to advance the resin, with subsequent cooling of this part of the resin, to inhibit further advancement and the addition to this partially advanced resin of another fraction of low molecular weight resin, which produces a fraction of relatively low molecular weight material combined with more highly advanced material in the adhesive. In this initial reaction period of the resin which is partially advanced during the adhesive manufacture, it may be convenient to include with the resin the polyvinyl alcohol dispersed in the flour and water, together with any comminuted vegetable shell material which may be present as an extender or for other reasons. Usually from about 25 to 75 percent of the resin in the mixture comprises the more highly advanced resin, and the remainder of the resin, the unadvanced low molecular weight resin.

As brought out in U.S. Pat. No. 3,081,217, resins prepared from phenol and aldehydes under alkaline conditions progressively advance from monomeric phenol alcohols to substances of higher molecular weight. Conventional resins employed in the wood products industry typically have been advanced whereby the resin polymers have relatively high molecular weight, ranging sometimes as high as 20,000. The molecular weights of such resins are determined using such procedures as the porous diaphram diffusion method outlined in said patent. In preparing adhesives according to this invention, low molecular weight resins may be resins having apparent average molecular weights as determined by such method typically lying within the range of about 500 to 2,000. A resin of this description is relatively stable, and can be used in preparing the fraction of more highly advanced resin in the adhesive, by the preliminary reaction period briefly described above, which serves partially to advance such resin during the preparation of the adhesive product.

The polyvinyl alcohol, when included with the adhesive compositions as contemplated, while increasing the viscosity of the composition somewhat, more importantly produces a noticeable change in the body or tackiness of the composition. The viscosity of the composition is not appreciably different from that of a composition which might be prepared with the inclusion of only 0.5 percent by weight of polyvinyl alcohol, but the tackiness or body of the compositions is materially increased when the amounts of polyvinyl alcohol added are within the range specified, of from 4 to 11 percent of the resin solids.

The following examples specifically illustrate certain forms of adhesive compositions prepared as contemplated herein. Parts referred to are parts by weight, unless otherwise indicated.

EXAMPLE I

An adhesive was prepared suitable for bonding of thin hardwood veneers, by first mixing 90 parts of wheat flour with 300 parts of warm water (200° F.), to prepare a glutinous mass of the mixture, which mass had a flowable consistency resembling that of a thick pastey starch. To this mass 30 parts of polyvinyl alcohol were added slowly, with mixing, to completely disperse the polyvinyl alcohol in the mass. After the dispersion of the polyvinyl alcohol, 300 additional parts of warm water were added together with 90 parts diatomaceous earth, with a short stirring.

To this mixture were added, with the temperature of the mixture maintained at approximately 170° F., 700 parts of a phenol formaldehyde resin and 1 part of an antifoaming agent (silicone). The mixture resulting was maintained at this temperature for approximately 25 minutes, with advancement of the resin occurring during this reaction period.

The resin utilized was an aqueous solution of phenol formaldehyde solution containing 56 percent solids, having a pH of approximately 10.8, an approximate molecular weight of 1500, and a mole ratio of formaldehyde to phenol of 2.20:1.

After the reaction period indicated, the mixture was reduced in temperature to approximately 100° F. to inhibit further advancement of the resin portion in the mixture. To the cooled reaction mass, 700 additional parts of resin were added with mixing, the resin being the same resin as was added at the first addition described. The pH of the resulting mixture was 10.5.

The adhesive resulting was utilized in bonding of thin hardwood veneers of both one-sixteenth inch and one twenty-sixth inch thickness to Douglas fir veneer in a plywood assembly. The hardwood veneers were oak veneers, dried to moisture contents ranging from 8 to 15 percent at which moisture content they retained their pliability. The fir veneers were dried to a moisture content of about 5 percent.

Plywood assemblies so produced were pressed, using a press schedule of five minutes at temperatures of 300° F. to produce curing of the glue lines formed.

In producing the plywood assemblies, spreads of the adhesive were prepared using 20 pounds of adhesive per 1,000 square feet of single glue line (equivalent to 40 pounds per 1,000 square feet of double glue line). The final plywood products prepared showed no bleeding or staining, as characterizes the use of conventional wet phenolic resin adhesives. The plywood products produced met exterior grade hardwood plywood specifications (PS 51-71), and also met softwood exterior grade specifications (PS 1-66).

EXAMPLE II

Another adhesive composition was prepared including an extender such as walnut shell flour. Initially a mixture of 300 parts of warm water and 90 parts of wheat flour was prepared. This was blended together to produce a glutinous mass. To the resulting product 30 parts of polyvinyl alcohol were added with stirring to produce a completely dispersed mixture contained the polyvinyl alcohol. Three hundred additional parts of warm water were then added together with 50 parts diatomaceous earth and 75 parts walnut shell flour, with a short stir.

To the resulting mixture, 520 parts of phenol formaldehyde resin of the type utilized in Example I were added with mixing, and the temperature of the mixture resulting was maintained at approximately 180° F. The mixture was maintained at this temperature for a period of approximately 35 minutes to accomplish partial advancement of the resin fraction added, and some preliminary digestion of the walnut shell material. After this reaction period, the reaction mass was reduced in temperature to approximately 100° F., and 780 additional parts of resin were added to the mixture. The resulting resin had a pH of approximately 10.2.

The adhesive composition so produced was used in the preparation of seven-sixteenths inch 5-ply Douglas fir plywood panels faced with lauan veneer, a hardwood obtainable from the Philippines. The veneer had a thickness of approximately one-twentieth inch. The veneer used in the layup of the panel assemblies had moisture contents of approximately 10 percent. Glue lines bonding the lauan veneer faces were prepared with spreads of 20 pounds per 1,000 square feet of single glue line.

Panels so produced met exterior grade hardwood plywood specifications as well as exterior grade softwood plywood specifications. No evidence of overpenetration of the hardwood faces as by bleeding, etc. was noted.

EXAMPLE III

An adhesive composition was prepared such as might be utilized in the production of exterior grade plywood from Douglas fir using veneers of Douglas fir as faces as well as center plies. In the preparation of the adhesive, a thick paste was prepared from 53 parts wheat flour and 375 parts water at 200° F. After mixing a glutinous mass was produced of flowable consistency. Into this mixture 24 parts of polyvinyl alcohol were introduced by sifting such slowly into the mix until complete dispersion was obtained. Three hundred seventy five parts of water at 200° F., together with 250 parts walnut shell flour, were then added with a short stir.

Ninety two parts of a 50 percent sodium hydroxide solution were then incorporated with the mixture to promote digestion of the walnut shell flour. After mixing for about 3 to 5 minutes, 450 parts of the phenol formaldehyde resin of Example I were added to the hot mix, together with 1 part antifoaming agent. The resin was cold at the time of mixing, so the introduction of the resin reduced the temperature of the resultant mass to about 175° F. The temperature of the mass was maintained at between 160° F. and 175° F. for approximately 15 minutes with further digestion of the walnut shell material and advancement of the fraction of the resin added to the mix. After this cooking period, the mix was reduced in temperature to approximately 100° F., and 300 additional parts of resin introduced. The pH of the resulting adhesive was 11.4.

The adhesive composition so prepared was utilized in the production of five-sixteenths inch Douglas fir plywood panels, using veneers having moisture contents ranging from 5 to 12 percent, employing a press time of approximately 2¼ minutes and a press temperature of 300° F. Spreads of 22 pounds per 1,000 square feet of single glue line were employed. The resulting plywood panels produced met requisite specifications for exterior grade use. Good bonds with no delamination present were observed.

In all the adhesive compositions above prepared the glue spreads after their preparation exhibited excellent prepressability. Plywood assemblies after being laid up and before being transferred into a press could be easily transported in the manufacturing facility, without observable displacement of the stacked veneer layers in a plywood assembly.

It is claimed and desired to secure by Letters Patent:

1. In the preparing of an adhesive for the bonding of wood, the method comprising blending a mass of water, cereal grain flour, and polyvinyl alcohol to obtain a glutinous mass therefrom with the polyvinyl alcohol dispersed therein, mixing with said mass a low molecular weight phenol aldehyde resin, reacting the resulting product at temperatures ranging from about 150°F. to reflux temperature and for a period terminated before an insoluble, infusible stage resin is produced to advance the resin, cooling the product to inhibit further advancement of the resin, and mixing with the cooled product additional low molecular weight phenol aldehyde resin to obtain the adhesive containing resin fractions of different degrees of advancement, the polyvinyl alcohol incorporated in the adhesive being in an amount ranging from about 4 to 11 percent by weight of the resin solids in the adhesive, and the resin initially mixed comprising from about 25 to 75 percent of the total resin in the adhesive, the mole ratio of aldehyde to phenol in the resin used lying within the range of about 2.0:1 to 2.6:1.

2. The method of manufacturing a plywood product where such includes a hardwood veneer facing comprising preparing an adhesive from a water-based phenol aldehyde resin, extender, and polyvinyl alcohol, said adhesive being prepared by the preparation of a dispersion of the polyvinyl alcohol in water with the polyvinyl alcohold ranging in an amount from 4 to 11 percent by weight of the resin solids in the adhesive, said adhesive further being prepared by incorporating with said water dispersion of polyvinyl alcohol a water-based phenol formaldehyde resin containing one fraction of relatively low molecular weight constituting from 25 to 75 percent of the resin in the adhesive and a remaining fraction of more highly advanced resin which is still in a fusible and water soluble stage, the mole ratio of aldehyde to phenol in the resin used lying within the range of about 2.0:1 to 2.6:1, the pH of the resulting adhesive not exceeding about 10.5, the adhesive having a water content ranging from 40 to 60 percent by weight of the adhesive and a resins solids content ranging from 24 to 36 percent by weight, laying up a plywood assembly with said adhesive spread between the hardwood veneer facing and the remainder of the assembly, said hardwood veneer facing having a moisture content within the range of 8 to 15 percent, and applying heat and pressure to consolidate the assembly and form a plywood panel therefrom.

3. An adhesive for the production of a plywood product, the adhesive being prepared from a phenol aldehyde resin, water, an extender, and polyvinyl alcohol, the adhesive containing one fraction of resin of low molecular weight and another fraction of resin of significantly higher molecular weight with both such fractions being in a fusible and water soluble stage, the mole ratio of aldehyde to phenol in the resin used lying within the range of about 2.0:1 to 2.6:1, the resin solids in the adhesive constituting from about 18 to 36 percent by weight of the weight of the adhesive, the polyvinyl alcohol in the adhesive constituting from about 4 to 11 percent by weight of the resin solids in the adhesive.

4. In the manufacture of an adhesive for the bonding of wood from vegetable shell material and a phenol aldehyde resin, the method comprising preparing a mixture of water, cereal grain flour, alkali, polyvinyl alcohol and comminuted vegetable shell material, the alkali being introduced to the mixture after the production of a glutinous mass from the polyvinyl alcohol, flour and water, with the polyvinyl alcohol dispersed in such glutinous mass, mixing with this mass a first fraction of low molecular weight phenol aldehyde resin, reacting the resulting product at temperatures ranging from 150°F. to reflux temperature and for a period terminated before an insoluble, infusible stage resin is produced to advance the resin, cooling the product to inhibit further advancement of the resin in the product, and mixing with the cooled product a second fraction of low molecular weight phenol aldehyde resin to obtain the adhesive, the polyvinyl alcohol incorporated in the adhesive being in an amount ranging from about 4 to 11 percent by weight of the resin solids in the adhesive, and the first fraction of resin introduced comprising from about 25 to 75 percent of the total resin in the adhesive, the mole ratio of aldehyde to phenol in the resin used lying within the range of about 2.0:1 to 2.6:1.

* * * * *